(12) United States Patent
LaMontagne et al.

(10) Patent No.: US 7,584,644 B2
(45) Date of Patent: Sep. 8, 2009

(54) CALIBRATOR FOR FUEL PUMP

(76) Inventors: Guy LaMontagne, 7262 22$^{nd}$ Avenue, Montreal, Quebec (CA) H2A 2H4; Jacques LaMontagne, 2000 12$^{th}$ Avenue, Montreal, Quebec (CA) H1B 3Z1

(*) Notice: Subject to any disclaimer, the term of this patent is extended or adjusted under 35 U.S.C. 154(b) by 378 days.

(21) Appl. No.: 10/594,788

(22) PCT Filed: Mar. 18, 2005

(86) PCT No.: PCT/CA2005/000365
§ 371 (c)(1),
(2), (4) Date: Sep. 29, 2006

(87) PCT Pub. No.: WO2005/100932
PCT Pub. Date: Oct. 27, 2005

(65) Prior Publication Data
US 2007/0214863 A1  Sep. 20, 2007

(30) Foreign Application Priority Data
Apr. 13, 2004  (CA) .................................. 2463477

(51) Int. Cl.
*G01F 25/00* (2006.01)
(52) U.S. Cl. ....................................... 73/1.74
(58) Field of Classification Search .......... 73/1.73–1.74
See application file for complete search history.

(56) References Cited

U.S. PATENT DOCUMENTS

| | | | |
|---|---|---|---|
| 2,772,561 A | 12/1956 | Plank et al. | |
| RE28,294 E | * 1/1975 | Hansel | ......................... 141/52 |
| 4,216,674 A | 8/1980 | Butcher et al. | |
| 4,474,049 A | 10/1984 | Hansen et al. | |
| 4,498,346 A | 2/1985 | Schneider | |
| 4,720,800 A | 1/1988 | Suzuki et al. | |
| 5,277,054 A | 1/1994 | Campbell | |
| 5,284,046 A | * 2/1994 | Jensen et al. | .................. 73/1.31 |
| 6,244,094 B1 | 6/2001 | Matthews et al. | |
| 6,541,063 B1 | 4/2003 | Prentice et al. | |

FOREIGN PATENT DOCUMENTS

| | | |
|---|---|---|
| CA | 1292129 | 11/1991 |
| EP | 0 559 925 | 3/1992 |
| EP | 480088 A * | 4/1992 |

* cited by examiner

Primary Examiner—Hezron Williams
Assistant Examiner—Nashmiya S Fayyaz
(74) Attorney, Agent, or Firm—Robert Platt Bell

(57) ABSTRACT

The inventive device comprises scaled vessels mounted on a vehicle and making it possible, while filling a liquid medium in the vessels, to recycle the vapors thereof through a circuit of casings beginning form he reading sights of the vessels and extending to an air-vent pipe provided wit a removable valve, wherein the bottom of each vessel is embodied such that it is inclined and is followed by a valve, a transparent dripping reference unit and a second valve open into a common tube and ending by an ultimate valve.

8 Claims, 1 Drawing Sheet

CALIBRATOR FOR FUEL PUMP

CROSS-REFERENCE TO RELATED APPLICATIONS

The present application is U.S. National Phase §371 application of International Application No. PCT/CA2005/000365 filed on Mar. 18, 2005, which in turn claims priority from Canadian Patent Application Ser. No. 2,463,477, filed on Apr. 13, 2004, both of which are incorporated herein by reference.

FIELD OF THE INVENTION

The present invention comprises a liquid measurement device for use in, but not limited to, the measuring and calibrating of liquid flowmeters, mostly for petroleum liquids. In particular, the present invention comprises a method and apparatus for calibrating petroleum fuel meters ("gas pumps"), such as at gas stations and the like.

BACKGROUND OF THE INVENTION

For petroleum products sold in the retail sector, the method currently used to calibrate meters is dangerous and outdated. In the Prior Art, for each meter, the technician performs the following steps:
1. Place the calibration tank on the ground;
2. Fill the calibration tank with the fuel nozzle of a gas pump;
3. Kneel and take the measurement of the level of the liquid;
4. Write the measurement down;
5. Empty the calibration tank making sure it is truly empty, for the next filling (the technician must not see any drops dripping down for a certain amount of time);
6. Adjust the calibration of the meter; and
7. Repeat steps 1 through 6 until the calibration is adequate.

During the whole process, spills, fumes and damage are inevitable and the technician is constantly exposed to fumes. Accidents are frequent.

The main inconvenience the need to wait until the last drops have fallen during the emptying of the tank.

U.S. Pat. No. 5,277,053 by Campbell describes a method by which calibration of current systems are done under actual conditions. It includes a first measure at a distance of a first spot, followed by a second measure from a second spot, knowing exactly the move from the first spot, that way the measures are done with a precise knowledge of the shift to get a constant calibration.

SUMMARY OF THE INVENTION

The present invention comprises a calibrator for liquid-flow meters, which is used to calibrate liquid-flow meters, mostly for petroleum liquids. The present invention makes the calibration operation safe, and it also protects the operator, the public, and the environment. It may also be used advantageously for the measurement of any liquid with the appropriate viscosity.

In the present invention, certain quantity of liquid goes through one tank, with other tanks being arranged in series, allowing accelerated calibration of retail petroleum products.

The calibrator is made of one or several graduated tanks containing 20 liters each, (or other measurement units depending on the country or requirements), mounted on a vehicle.

Reading the meter is easy, precise, and ergonomic.

Fumes from the calibration process are recycled.

In the present invention, each of the tanks has a sloped bottom (40 degrees or so), followed by a valve, a transparent dripping reference unit and a second valve attached to a common pipe (sloped) and ending with an ultimate valve. The piping is made of stainless steel.

The transparent drip reference unit is provided to allow the user to see that all fluid has been drained from the tank(s) prior to refilling.

This particular arrangement allows liquid circulation in a closed circuit, eliminating handling spills, loss of liquid, and escaping fumes The invention allows the liquid to return without fumes or turbulence, making the calibration 100% safe. Therefore, the present invention helps eliminate fumes, spills, and splashes, during both the filling and the emptying of the tanks. The technician will not have to repeatedly pour the liquids from the test-tank to underground tank.

DETAILED DESCRIPTION OF THE INVENTION

Figure 1:
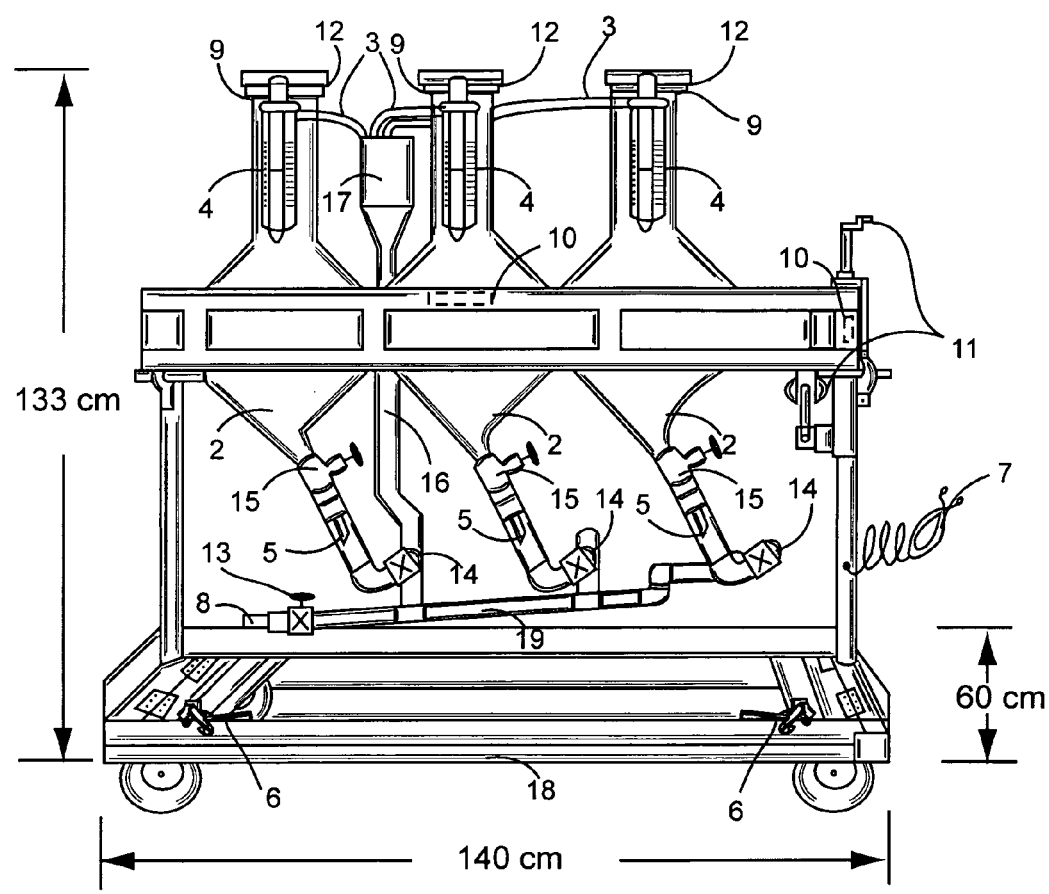
FIG. 1 is a side view of the present invention.

Referring to FIG. 1, calibrator 1 is a machine used to calibrate petroleum liquid-flow meters. It can also be used for any liquid with adequate viscosity.

Calibrator 1 comprises of one or several stainless steel graduated tanks 2 mounted on a level-able vehicle 18. When filling, fumes are recycled by way of hose 3 coming from the top of the necks of tanks 2 and ending in ventilation pipe 16 equipped with removable exhaust valve 17 on top. Each of tanks 2 has a sloped bottom, at roughly a 40 degree angle, followed by valve 15, transparent drip reference unit 5 and another valve 14 leading to common pipe 19 and exit valve 13. The piping is made of stainless steel. When emptying the apparatus, the fumes are also recycled. The whole emptying process is done in a closed circuit without turbulence and without fumes.

The transparent dripping reference unit 5 makes calibration work safer by allowing the user to view the flow of fuel through the apparatus and know when the flow has stopped.

To calibrate with the invention, the technician takes the following steps:
1. Park the calibrator near the fuel pump.
2. Use the lever 6 to lift the wheels off the ground.
3. Ground the calibrator to the pump, with conductor with alligator clip 7.
4. Install a gasoline return hose (not shown) between final exit pipe 8 and the gas station's underground tank.
5. Open exit valve 13
6. Fill tanks 2, one at a time, by inserting the gas pump nozzle into neck 9 of one of tanks 2. Neck 9 traps the fumes, as the opening of neck 9 is lined with a rubber gasket which is in contact with the nozzle.
7. Adjust the two levels 10 to both axes with the two handles 11 to level the unit.
8. Take the readings while standing up using calibrated scale 4.
9. Note the readings by turning the round pre-marked recall set-up 12.
10. Open the valves 13, 14, and finally 15, to empty out the tanks.
11. Adjust the meters of the pump, if need be.
12. Close valve 14 as soon as the tanks are empty.

13. Make sure the tanks are truly empty before closing valve 15, by observing the last drops of liquid dripping down, through the transparent drip reference unit 5.
14. Proceed with new test as required.

While the preferred embodiment and various alternative embodiments of the invention have been disclosed and described in detail herein, it may be apparent to those skilled in the art that various changes in form and detail may be made therein without departing from the spirit and scope thereof.

We claim:

1. A calibrator for calibrating a fuel pump, comprising:
    at least one graduated tank, mounted on a levelable vehicle, the at least one graduated tank having sloped bottom and a neck for receiving a fuel station fuel pump nozzle;
    a fume recycling circuit coupled to the neck to recycle fumes during filling and also coupled to a ventilation pipe;
    a level indicator to measure liquid level in the at least one graduated tank;
    at least one tank valve coupled to the bottom of the at least one graduated tank;
    a transparent drip reference unit coupled to the at least one tank valve, for allowing a user to view flow of fuel through the transparent drip reference unit; and
    a discharge valve coupled to the transparent drip reference unit and coupled to a common pipe ending with a exit valve, the exit valve for coupling to a discharge hose for discharging measured fuel back into a fuel station storage tank.

2. A method of calibrating a fuel pump, using a calibrator comprising at least one graduated tank, mounted on a levelable vehicle, at least one graduated tank having a sloped bottom and a neck for receiving a fuel station fuel pump nozzle, a fume recycling circuit coupled to the neck to recycle fumes during filling and also coupled to a ventilation pipe, a level indicator to measure liquid level in the at least one graduated tank, at least one tank valve coupled to the bottom of the at least one graduated tank, a transparent drip reference unit coupled to the at least one tank valve, for allowing a user to view flow of fuel through the transparent drip reference unit, and a discharge valve coupled to the transparent drip reference unit and coupled to a common pipe ending with a exit valve, the exit valve for coupling to a discharge hose for discharging measured fuel back into a fuel station storage tank, the method comprising the steps of:
    a. parking the calibrator near the fuel pump,
    b. leveling the calibrator using a leveler mounted to the calibrator,
    c. grounding the calibrator to the fuel pump,
    d. coupling a fuel return hose between the exit valve and a fuel station storage tank,
    e. filling the at least one graduated tank by inserting the fuel pump nozzle in the neck of the at least one graduated tank, wherein the neck seals fuel fumes when the neck makes contact with the fuel pump nozzle,
    f. taking a reading of the fuel level in the at least one graduated tank after dispensing a measured amount of fuel, into the at least one graduated tank,
    g. noting the reading by turning a pre-marked recall set-up,
    h. opening the at least one tank valve, the discharge valve and the exit valve to empty out the at least one graduated tank,
    i. adjusting calibration of the fuel pump if required,
    j. closing the discharge valve when the at least one graduated tank is empty,
    k. insuring that the at least one graduated tank is truly empty before closing the at least one tank valve, by observing the final drops of liquid dripping down through the transparent drip reference unit, and
    l. repeating the calibration test as required.

3. A calibration apparatus for calibrating a gas station fuel dispensing pump, the calibration apparatus comprising:
    at least one graduated tank having a sealing neck for receiving a fuel station fuel pump nozzle and a sloped bottom;
    a graduation portion on the neck of the at least one graduated tank, for indicating when a standard quantity of fuel has been inserted into the at least one graduated tank;
    a fume recycling circuit coupled to the neck of the at least one tank to recycle fumes during filling;
    at least one tank valve coupled to the bottom of the at least one graduated tank;
    a transparent drip reference unit coupled to the at least one tank valve, for allowing a user to view flow of fuel through the transparent drip reference unit; and
    a discharge valve coupled to the transparent drip reference unit and coupled to a common pipe ending with a exit valve, the exit valve for coupling to a discharge hose for discharging measured fuel back into a fuel station storage tank.

4. The calibration apparatus of claim 3, wherein the at least one graduated tank is, mounted on a wheeled vehicle so as to be readily moved into position near the fuel dispensing pump, the wheeled vehicle comprising:
    a lever for raising wheels of the wheeled vehicle off the ground; and
    a two-axis leveling apparatus to level the calibration apparatus prior to use.

5. The calibration apparatus of claim 3, wherein the fume recycling unit further includes a removable exhaust valve to exhaust fumes after testing is completed.

6. The calibrator of claim 1, wherein the fume recycling circuit further includes a removable exhaust valve to exhaust fumes after testing is completed.

7. The method of calibrating of claim 2, wherein the fume recycling circuit further includes a removable exhaust valve to exhaust fumes after testing is completed.

8. The method of calibrating of claim 2, wherein the levelable vehicle includes a plurality of wheels for moving the levelable vehicle, and said step of parking the calibrator near the fuel pump further comprises the step of retracting the plurality wheels.

* * * * *